United States Patent Office 3,494,920
Patented Feb. 10, 1970

3,494,920
1-DI(LOWER)ALKYLAMINO(LOWER)ALKYL-3-(2-SUBSTITUTED ETHYL) INDOLES
David R. Herbst, King of Prussia, Pa., assignor to American Home Products Corporation, New York, N.Y., a corporation of Delaware
No Drawing. Application Jan. 18, 1966, Ser. No. 521,431, which is a continuation-in-part of application Ser. No. 383,971, July 20, 1964. Divided and this application Dec. 18, 1967, Ser. No. 720,422
Int. Cl. C07d 99/00, 57/00; A61k 27/00
U.S. Cl. 260—247.5
4 Claims

ABSTRACT OF THE DISCLOSURE

1 - (di(lower)alkyl-amino(lower)alkyl) - 3 - ((2 - di-(lower)alkylamino-, pyrrolidino, piperidino- or morpholinoethyl)) indoles (A) are prepared by reacting the corresponding 2-((di(lower)alkylamino-, pyrrolidino, piperidino- or morpholino)) ethyl indoles (B) with a di-(lower)alkylamino(lower)alkyl halide in an inert solvent in the presence of a strong base. Compounds (A) and their non-toxic salts are therapeutically useful, demonstrating central nervous system activity and anti-inflammatory activity.

This is a division of application Ser. No. 521,431, filed Jan. 18, 1966, now abandoned, which in turn is a continuation-in-part of "Derivatives of 3-(2-Dialkylaminoethyl) Indoles," U.S. Ser. No. 383,971, filed on July 20, 1964, now abandoned.

This invention relates to new and useful indole compounds as well as to the novel method for their preparation. In particular, the present invention is concerned with 1-substituted-3-(2-substituted ethyl) indoles having pharmacodynamic activity.

The new compounds included within the purview of this invention are represented by the following general formula:

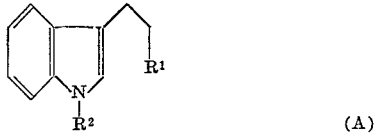

(A)

wherein $R^1$ is selected from the group consisting of di-lower-alkylamino, pyrrolidinyl, piperidino and morpholino and $R^2$ is di(lower)alkylamino(lower)alkyl.

The new compounds of the present invention are prepared by first treating a solution of a selected indole of the following structure:

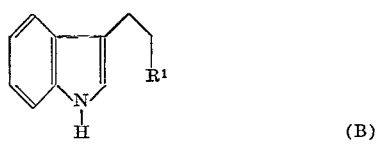

(B)

wherein $R^1$ has the value previously ascribed in an inert solvent such as dimethylformamide or toluene with either an alkali metal hydride or an alkali metal amide at a temperature in the range of about 25° C. to about 110° C. for a period of about 1 to about 5 hours. Thereafter, a dialkylaminoalkyl halide is added to the reaction mixture at a reaction temperature from about 25° C. to about 110° C. for a period of from about 12 to about 18 hours, preferably about 16 hours. The reaction mass is then extracted with either dilute aqueous hydrochloric acid or benzene to provide a crude product which may be thereafter purified according to conventional procedures such as by chromatography.

The 1-substituted bases obtained according to the foregoing reaction are then convertible to their acid salts such as the hydrochloric acid salts by treating an ethereal solution of the free base with either gaseous or isopropanolic hydrogen chloride. Other acid salts may also be prepared by treating the free base form of the compounds described with other acceptable organic or inorganic acids. Suitable acids for this purpose include hydrobromic, sulfuric, phosphoric, nitric, benzoic, methylsulfonic, p-tolylsulfonic, benzenesulfonic, naphthalenesulfonic, salicyclic, glycolic, acetic, maleic, succinic, tartaric, stearic, palmitic, citric, glutaric, lactic and the like.

The starting indoles generally identified by formula B above are known or are prepared by methods such as that disclosed by M. E. Specter and W. C. Anthony, U.S. Patent 2,870,162 (Jan. 20, 1959), and T. Vitali and F. Massini, Boll. Sci. Fac. Chim. Ind. Bologna, 17, 84–7, (1959) [C.A., 54, 19644b(1960)].

The new compounds of the present invention encompassed within those defined by the Formula A above possess quite unexpectedly, valuable pharmaceutical properties. In particular the new compounds of the present invention possess central nervous system activity and anti-inflammatory activity. These new compounds are therefore useful for such purposes.

When used for the purposes described above, it may be desirable according to conventional pharmaceutical practice to combine the specific compound identified into compositions suitable for enteral or parenteral administration by combining the same with a pharmaceutically administrable organic or inorganic carrier. The composition may be prepared in solid form, such as in tablets or in liquid form such as a solution, suspension or emulsion. Suitable liquid carriers include water, gelatin, lactose, starch, talc, vegetable oils, alcohols, polyalcohols, gums, USP syrups and the like. The pharmaceutical composition in addition to the active principle and the carrier may include auxiliary materials such as coloring, stabilizing, wetting or emulsifying agents. It is of course recognized as essential that the carrier as well as any other materials present with the active principle be inert with respect thereto.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 10 mg. to about 400 mg. per day, although as aforementioned veriations will occur. However, a dosage level that is in the range of from about 20 mg. to about 200 mg. per day is most desirably employed in order to achieve effective results.

Reference now to the specific examples which follow will provide a better understanding of the new compounds of the present invention as well as of the method by which the same can be prepared. In these examples hereinafter, the starting indoles used may be identified for convenience by numerals I–IV. The numerals represent the following compounds, (I) 3-[2-(1-pyrrolidinyl)ethyl] indole, (II) 3-(2-diethylaminoethyl) indole, (III) 3-(2-piperidinoethyl) indole and (IV) 3-(2-morpholinoethyl) indole.

EXAMPLE I

A mixture of 5.75 g. 3-(2-piperidinoethyl)indole (III), 350 ml. dry toluene and 0.70 g. lithium amide is refluxed 4 hours, cooled to ca. 25° C. and 3.68 g. 3-dimethylaminopropyl chloride is added. After refluxing 16 hours, the mixture is filtered, the toluene solution is washed with water and the product is extracted into 2 N hydrochloric acid. Washing of the acidic extracts with ether is followed by basification of the aqueous solution with excess concentrated aqueous sodium hydroxide solution and extraction of the basic product into ether. Thorough washing of the ethereal solution with water, drying (sodium sulfate) and evaporation of the solvent affords a brown oil which is dissolved in ether and is treated with excess gaseous hydrogen chloride. The salt thus prepared is crystallized (thrice) from methanol-ethyl acetate to give 1-(3-dimethylaminopropyl) - 3 - (2-piperidinoethyl)indole, dihydrochloride (V, 58%) M.P. 269.5–270.5° C., $\lambda_{max}^{KBr}$ 4.08$\mu$, $\lambda_{max}^{95\% EtOH}$ 224.5 ($\epsilon$ 32,680), 287 ($\epsilon$ 6,370) 296.5 (shoulder 5,310) m$\mu$.

By the same procedure, the following salts are prepared:

What is claimed is:

1. A compound selected from the group consisting of a compound having the formula:

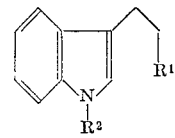

wherein $R^1$ is selected from the group consisting of pyrrolidino, piperidino and morpholino and $R^2$ is 3-dimethylaminopropyl and the nontoxic, therapeutically administrable acid addition salts thereof.

2. A compound as described in claim 1 which is: 1-(3-dimethylaminopropyl) - 3 - [2 - (1-pyrrolidinyl)ethyl] indole.

3. A compound as described in claim 1 which is: 1-(3-dimethylaminopropyl)-3-(2-piperidinoethyl)indole.

4. A compound as described in claim 1 which is: 1-(3-dimethylaminopropyl)-3-(2-morpholinoethyl)indole.

TABLE I

| Product | Reactant | M.P., ° C. | Crystallizing Solvent | $\lambda_{max}^{KBr}$ ($\mu$) | $\lambda_{max}^{95\% EtOH}$ (m$\mu$) | $\epsilon$ |
|---|---|---|---|---|---|---|
| VI | $(CH_3)_2N(CH_2)_3Cl$ | 238–240 | Methanolethyl acetate, acetonitrile | 3.94, 4.12 | 224.5 | 34,960 |
|  |  |  |  |  | 282–290 | 6,260 |
|  |  |  |  |  | 295 (sh) | 5,400 |
| VII [1] | $(CH_3)_2N(CH_2)_3Cl$ | 236.5–238.5 | Acetonitrile | 3.92, 4.12 | 224 | 32,760 |
|  |  |  |  |  | 287 | 5,860 |
|  |  |  |  |  | 295 (sh) | 5,130 |

[1] In this case, the preceding procedure does not give complete alkylation and it is necessary to retreat the crude product with toluene, lithium amide and 3-dimethylaminopropylchloride in exactly the same manner as originally. The resulting base is purified by extraction into cold (0° C.) n-hexane. Removal of solvent gives a residue which upon dissolution in anhydrous ether and addition of excess isopropanolic hydrogen chloride affords crude XXV.

The products of the foregoing tables identified by numerals V to VII are more appropriately identified as the hydrochloric acid salts of the bases listed in Table 2 below:

TABLE 2

V—1-(3 - dimethylaminopropyl) - 3 - (2-piperidinoethyl) indole;

VI—1-(3-dimethylaminopropyl) - 3 - [2-(1-pyrrolidinyl) ethyl]indole;

VII—1-(3 - dimethylaminopropyl) - 3 - (2-morpholinoethyl) indole;

References Cited
UNITED STATES PATENTS 3,214,438  10/1965  Youngdale _____ 260—319

ALEX MAZEL, Primary Examiner

J. TOVAR, Assistant Examiner

U.S. Cl. X.R.

260—247.1, 247.2, 293, 293.4, 294, 326.14, 326.15; 424—248, 267, 274